(12) United States Patent
Van De Kerkhof et al.

(10) Patent No.: US 8,938,676 B2
(45) Date of Patent: Jan. 20, 2015

(54) SYSTEM FOR ADJUSTING A COMBINATION OF CONTROL PARAMETERS

(75) Inventors: Leon Maria Van De Kerkhof, Eindhoven (NL); Mykola Ostrovskyy, Eindhoven (NL); Arnoldus Werner Johannes Oomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1228 days.

(21) Appl. No.: 10/548,848

(22) PCT Filed: Mar. 12, 2004

(86) PCT No.: PCT/IB2004/050240
§ 371 (c)(1),
(2), (4) Date: Sep. 9, 2005

(87) PCT Pub. No.: WO2004/081782
PCT Pub. Date: Sep. 23, 2004

(65) Prior Publication Data
US 2006/0095147 A1 May 4, 2006

(30) Foreign Application Priority Data
Mar. 14, 2003 (EP) .................................... 03100661

(51) Int. Cl.
*G06F 3/16* (2006.01)
*G06F 3/0484* (2013.01)

(52) U.S. Cl.
CPC .................................. *G06F 3/04847* (2013.01)
USPC ............................ 715/728; 715/716; 715/727

(58) Field of Classification Search
CPC .................................................. G06F 3/04847
USPC .............. 715/716, 727, 728; 710/303; 725/46
See application file for complete search history.

(56) References Cited

U.S. PATENT DOCUMENTS

| | | | | |
|---|---|---|---|---|
| 5,334,992 A | * | 8/1994 | Rochat et al. | 345/22 |
| 5,359,703 A | * | 10/1994 | Robertson et al. | 345/419 |
| 5,373,309 A | * | 12/1994 | Totsuka et al. | 715/856 |
| 5,542,039 A | | 7/1996 | Brinson et al. | |

(Continued)

FOREIGN PATENT DOCUMENTS

| | | |
|---|---|---|
| EP | 0100640 A1 | 2/1984 |
| EP | 0 313 796 A2 | 9/1988 |

(Continued)

OTHER PUBLICATIONS

Written Opinion of the International Authority PCT/IB2004/050240, Sep. 9, 2005.

(Continued)

*Primary Examiner* — Andrey Belousov

(57) ABSTRACT

A method of enabling a user to adjust at least first and second control parameters for controlling an electronic system includes displaying a coordinate system on a display screen, where a first coordinate represents a range of values of the first control parameter, and a second coordinate represents a range of values of the second control parameter. The method further included visually indicating a position in coordinate system corresponding to a currently selected combination of values of the first and second control parameters, and enabling the user to select a new combination of values of the first and second control parameters by indicating a position within the coordinate system.

28 Claims, 2 Drawing Sheets

(56) References Cited

U.S. PATENT DOCUMENTS

Figure 1:
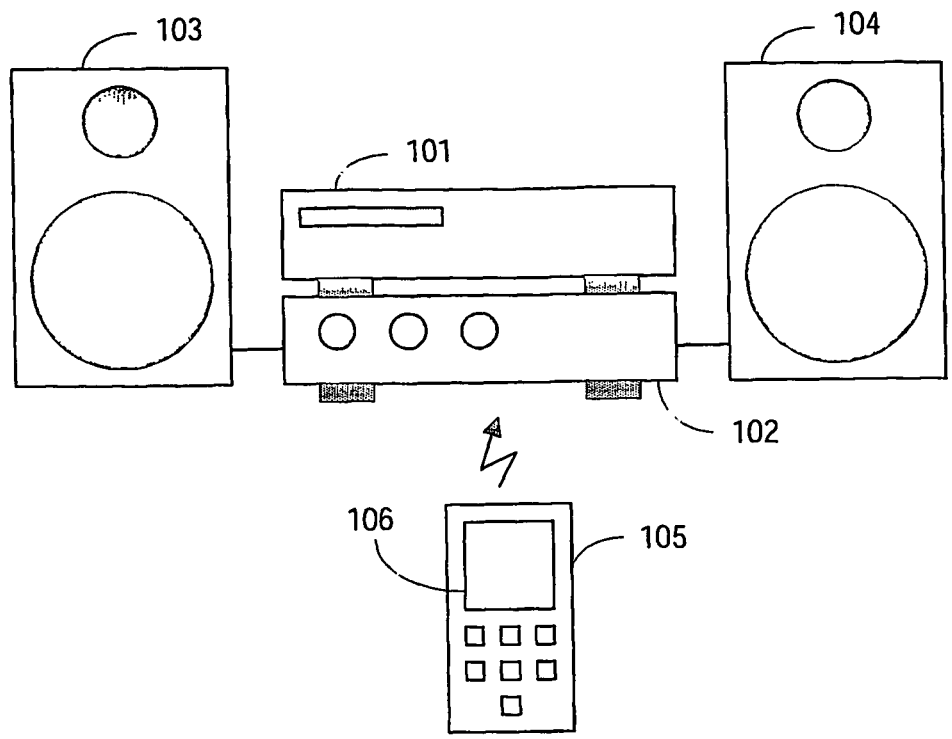

| | | | |
|---|---|---|---|
| 5,572,443 A * | 11/1996 | Emoto et al. | 702/103 |
| 5,798,761 A | 8/1998 | Isaacs | |
| 2003/0046638 A1 * | 3/2003 | Thompson | 715/500 |

FOREIGN PATENT DOCUMENTS

| | | |
|---|---|---|
| EP | 0654728 A2 | 5/1995 |
| JP | 7311853 A | 11/1995 |
| JP | 9331464 A | 12/1997 |
| JP | 11272385 A | 10/1999 |
| JP | 2002095864 A | 4/2002 |
| JP | 2003114678 A | 4/2003 |
| WO | 0039664 A1 | 7/2000 |
| WO | 0161447 A1 | 8/2001 |

OTHER PUBLICATIONS

Hamada et al: "Speech Controller With Gui for a Text-To-Speech Synthesizer and It'S Application in Designing an Interface for Keyword Emphasis"; Information Processing Society of Japan (IPSJ) Journal, vol. 34, No. 12, December 1993, pp. 2569-2577.

* cited by examiner

SYSTEM FOR ADJUSTING A COMBINATION OF CONTROL PARAMETERS

The invention relates to a method of enabling a user to adjust at least a first and a second control parameter for controlling an electronic system.

The invention further relates to an electronic system comprising a user interface for enabling a user to adjust at least a first and a second control parameter for controlling the electronic system.

The invention further relates to a computer program product for implementing the above method.

Many known electronic systems allow the user to control various functions of the system by adjusting certain parameters. For example, every television receiver allows the user to adjust parameters such as audio volume, picture brightness, etc. Content reproduction devices like video recorders offer track play modes such as fast forward/backward, pause, slow-motion, etc.

Such parameters are normally adjusted by means of hardware controls, such as buttons, jogwheel, etc., or graphical objects in a graphical user interface, such as software buttons and slider bars.

It is an object of the invention to provide an improved system and method of the type defined in the opening paragraph. To this end, the method according to the invention comprises the steps of:

displaying a coordinate system on a display screen, a first coordinate of said coordinate system representing a range of values of the first control parameter, and a second coordinate of said coordinate system representing a range of values of the second control parameter, visually indicating a position in said coordinate system corresponding to a currently selected combination of values of the first and the second control parameter, enabling the user to select a new combination of values of the first and the second control parameter by indicating a position within said coordinate system.

A disadvantage of the above prior-art systems is that each control parameter has to be adjusted individually. The method of the invention enables the user to adjust at least two control parameters in a single action, i.e. by just indicating within the coordinate system a position which corresponds to a desired combination of values of the first and the second control parameter. This is very convenient for certain pairs of control parameters. For example, a user may want to simultaneously adjust the audio volume and the bass and/or treble setting of an audio appliance. Current audio equipment often provides a 'loudness' or 'contour' function for this purpose, but this activates only a predefined and very specific correspondence relationship between the three parameters. As another example, recent developments in digital audio processing have made it feasible to independently control pitch and time/tempo of audio content. This is highly convenient for music teaching applications, e.g. slower playback for beginners without changing the tone, or an easier tone for particular instruments without changing the tempo. An additional advantage of the invention is that each combination of values of the first and the second control parameter is associated with a unique position within a two-dimensional or multi-dimensional space, which makes it easier for the user to remember how to set a particular combination of values, using his/her spatial memory.

A variant of the method of the invention further comprises the step of displaying a first coordinate axis comprising values of said range of values of the first control parameter, and a second coordinate axis comprising values of said range of values of the second control parameter. This provides the user, in addition to the spatial representation, with further guidance for properly adjusting the first and the second control parameter. The coordinate system may further comprise a grid of lines corresponding to parameter values at regular intervals. Advantageously, an intersection of said first and second coordinate axes represents a default combination of values of the first and the second control parameter. For example, the intersection of the axes may correspond to the neutral values of both control parameters.

A variant of the method of the invention further comprises the step of determining positions in the coordinate system representing desirable proportions between values of the first and the second control parameter. For example, said desirable proportions may correspond to one or more audio loudness functions. Advantageously, such positions may be visually connected in the coordinate system, so as to communicate the desirable proportions to the user. For example, a number of predetermined loudness curves may be displayed, to further guide the user in setting combinations of values for the audio volume and bass/treble setting. Preferably, the method of the invention further comprises the step of facilitating selection of a subsequent position representing a desirable proportion with respect to a current position. For example, a value combination selected by the user may automatically 'snap' to the nearest curve of desirable value combinations. Alternatively, the user may be provided with means to easily 'navigate' along a curve, e.g. by automatically selecting the desired value of one control parameter in response to slightly increasing or decreasing the value of the other control parameter.

The object of the invention is further realized in that the user interface is arranged to display a coordinate system on a display screen, a first coordinate of said coordinate system representing a range of values of the first control parameter, and a second coordinate of said coordinate system representing a range of values of the second control parameter, and to visually indicate a position in said coordinate system corresponding to a currently selected combination of values of the first and the second control parameter, and to enable the user to select a new combination of values of the first and the second control parameter by indicating a position within said coordinate system.

Figure 2:
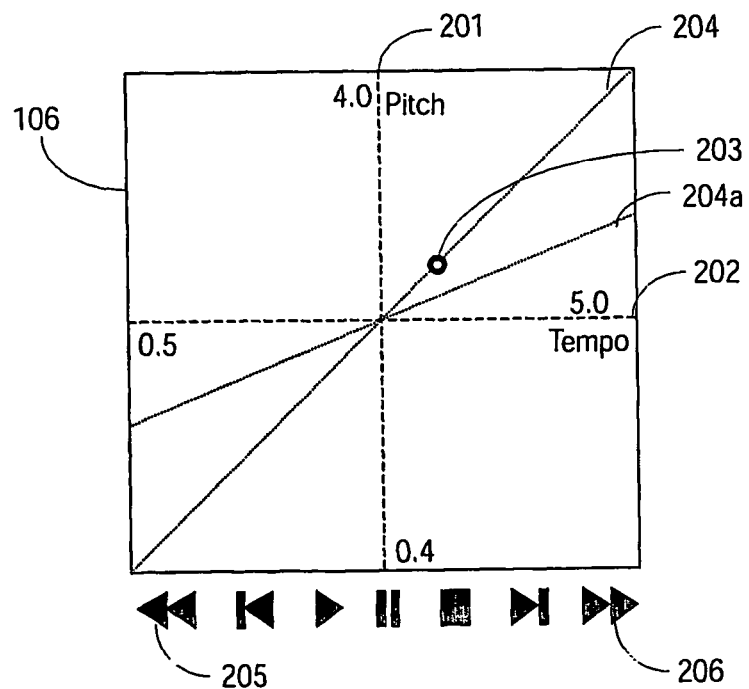
Figure 3:
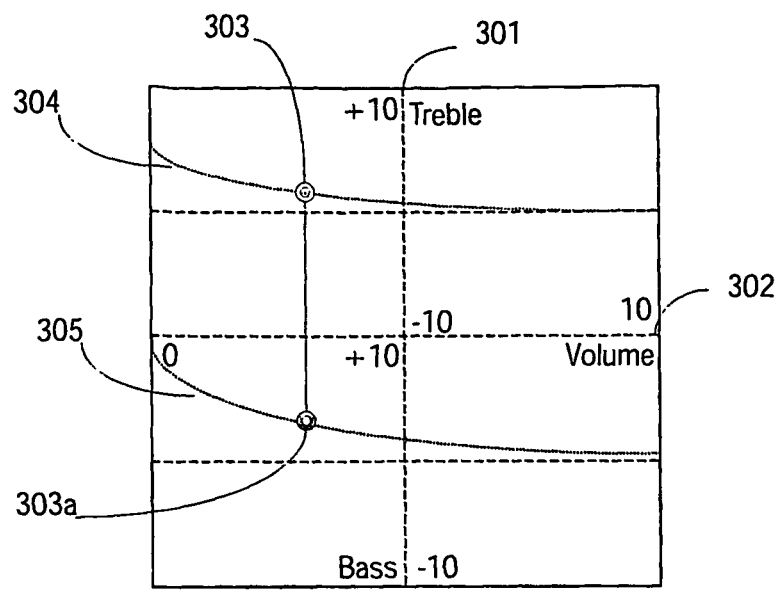
Figure 4:
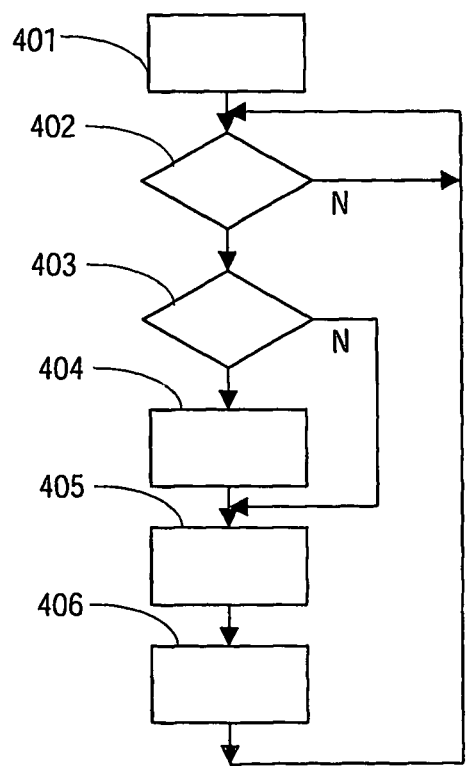

These and other aspects of the invention are apparent from and will be elucidated, by way of a non-limitative example, with reference to the embodiment(s) described hereinafter. In the drawings, FIG. 1 shows a diagram of an audio set as a system embodying the invention, FIG. 2 shows an example of a user interface for controlling pitch and tempo of audio content, FIG. 3 shows an example of a user interface for controlling volume, treble and bass of audio content, FIG. 4 shows an example of a method according to the invention.

FIG. 1 shows a diagram of an audio set as a system embodying the invention. It comprises an optical disc player 101, an amplifier 102, loudspeakers 103 and 104 and a remote control 105. The remote control 105 has a graphical display 106. The optical disc player 101 is capable of independently scaling pitch and time of audio content. The goal of time scaling audio signals is to vary the (instantaneous) duration of the signal, while providing the same perception of pitch as the original signal. The goal of pitch scaling audio signals is to vary the perceived pitch while keeping the duration of a signal constant. This can be achieved, for example, by a parametric coding scheme that is based on the notion that any audio signal can be decomposed into three objects: transients, sinusoids and noise. Transients represent the non-stationary part of the audio signal. Transients are characterized by a fast change in signal power or amplitude. Modeling transients using quasi-stationary patterns proves to be an inefficient approach. Sinusoids are used to represent tonal components that are clearly defined in frequency and typically last for a long time. Because of this clear definition in frequency, it is assumed that these spectral events can be modeled accurately using sinusoids. Noise represents the stochastic part of the audio signal. In nature, noise-like sources are often encountered, e.g. the rustle of the wind or unvoiced speech. The perception of such noise-like signals clearly differs from tonal signals. In order to preserve or reproduce the perception of noise-like signals, it is not necessary to precisely match the original waveform. It is sufficient to match only the spectral and temporal envelope. This makes the bit-rate requirements for this object low.

In order to enable time-scaling, the sinusoidal synthesis windows and noise temporal envelopes are scaled in the decoder with the appropriate (possibly time varying) factor. The time domain envelope of the transient object is not scaled. Perceptually, this gives a more natural result. Furthermore, in order to prevent discontinuities in the signal, the phase of a sinusoid going from one frame to the next is adjusted to ensure a smooth transition from one frame to the next.

Pitch scaling is implemented by scaling all the sinusoidal frequencies in a frame with the appropriate (possibly time varying) factor. Research has shown that only the lower harmonics contribute to the perceived pitch. These harmonics are modeled by the sinusoidal object; the noise object typically models the high-frequency range for voiced segments. Therefore, the noise parameters are preferably not changed when using pitch scaling.

As time- and pitch scaling are more or less 'orthogonal' procedures, they can be combined to virtually any combination. FIG. 2 shows a user interface according to the invention for controlling the tempo and pitch of audio content simultaneously. The user interface can be displayed on the graphical display 106 of the remote control 105. Alternatively, it may be presented on a graphical display on the optical disc player 101 on the amplifier 102, or on a separate display device such as a television receiver connected to the audio system. The graphical display 106 is preferably a touch screen, but it may also comprise alternative means for indicating a position within the display, e.g. a mouse or trackball. The graphical user interface comprises a coordinate system with a vertical axis 201 representing a range of pitch values, and a horizontal axis 202 representing a range of tempo values. The intersection of the axes 201 and 202 corresponds to the neutral values, i.e. the normal tempo and pitch as recorded. A pointer 203 indicates a currently selected combination of pitch and tempo values. The pointer 203 can be freely positioned by the user. However, the graphical user interface optionally comprises auxiliary curve 204 which represents all 'natural' proportions between the pitch and tempo values, i.e. the values which one would expect when playing audio content in an accelerated or decelerated manner. Positioning the pointer 203 proximate to the auxiliary curve 204 may cause 'snapping' the pointer to this curve, thus facilitating the selection of value combinations which are likely to be desirable. The position and inclination of the auxiliary curve may be predetermined, but the system may also allow the user to adjust these properties. For example, another auxiliary curve 204a may be defined by the user, reflecting his/her personal preference. The auxiliary curve may well coincide with, for example, the tempo-axis, thus indicating that no pitch change at all is desired when altering the tempo of the reproduced content. Selection of desirable value combinations may be further facilitated by additional control elements 205 and/or 206. These control elements may be part of the graphical user interface, or implemented as hardware buttons. They roughly correspond to the traditional fast rewind and fast forward buttons which are provided by most content reproduction appliances. However, in the system according to the invention, they have the additional function of facilitating the selection of desirable combinations of pitch and tempo. For example, if the pointer 203 is already on an auxiliary curve representing desirable value combinations, pressing control element 206 causes the tempo to be increased by a predetermined small amount, and the pitch to be changed by such an amount that the resultant value combination is again on the auxiliary curve. A repeated or prolonged operation of the control element 206 thus allows easy and quasi-continuous navigation along the auxiliary curve. Operation of control element 205 has the opposite effect If the auxiliary curve coincides with the tempo-axis, operating the control elements 205 and 206 causes the tempo of the reproduced content to be altered gradually without altering the pitch.

If the pointer 203 was not on an auxiliary curve, operating one of the control elements 205 and 206 may cause snapping the pointer to the auxiliary curve first. Alternatively, a new auxiliary curve may be generated through the current position of the pointer but further as similar as possible to the existing auxiliary curve, e.g. having the same inclination. For example, if the present auxiliary curve coincides with the tempo-axis, but the current pitch setting is slightly higher than the default setting, i.e. the pointer 203 is above the tempo-axis, operating control element 206 may cause the tempo to be increased but the pitch to keep its slightly-higher value, and optionally to display a new auxiliary curve parallel to the tempo-axis. In an alternative embodiment, the position of the auxiliary curve may be altered immediately in response to repositioning the pointer 203, so that the auxiliary curve again includes the new position of the pointer 203.

FIG. 3 shows an example of a user interface for controlling volume, treble and bass of audio content. As compared with the previous embodiment, the graphical display is now divided into an upper half and a lower half, for controlling treble and bass, respectively. The upper half of axis 301 represents a range of values of the treble setting, while the lower half of axis 301 represents a range of values of the bass setting. Horizontal axis 302 represents a range of values of the volume. Instead of one pointer, now two pointers 303 and 303a are provided for indicating the current value combinations of volume-treble and volume-bass. Naturally, the horizontal positions of both pointers are coupled, but their vertical positions can be altered independently. Auxiliary curves 304 and 305 are optionally provided for indicating optimal combinations of values, for example, corresponding to a proper loudness function. If the user indicates a new position in the upper half of the graphical display, the values of the treble and volume settings are adjusted accordingly, and the pointer 303 is relocated to the indicated position. The position of pointer 303a is also changed because its horizontal position should be the same as the horizontal position of pointer 303. In an embodiment, the bass setting may remain unchanged or may snap to a corresponding position of auxiliary curve 305. The user may also choose to select a new position of pointer 303a in the lower half of the graphical display, causing the pointer 303a to be relocated accordingly.

The user interface thus enables a user to adjust volume, treble and bass settings in a very easy manner. A potential drawback is that either of the pointers 303 and 303a can be relocated instantaneously, for example, corresponding to a very high volume. This may startle the user or may cause damage to the loudspeakers of other components of the system. This problem may be solved by limiting the amount by which the volume can be increased, i.e. indicating a new position at the right of the graphical display may actually cause the selection of a position in between the current position and the indicated position. For decreasing the volume, this safety measure is not required, and even undesirable because it is often necessary to quickly turn the volume down.

Instead of continuous auxiliary curves, the system may enable the user to define isolated positions reflecting certain desirable value combinations. The user may be further enabled to assign labels to such positions or curves, like 'jazz', 'classics', etc., thus indicating that the position or curve is particularly relevant for a certain category of music.

FIG. 4 shows an example of a method according to the invention. In step 401, the coordinate system is displayed, optionally including one or more coordinate axes, and/or indications of preferred value combinations of the selected control parameters. In step 402, user input is awaited. If the user indicates a new position within the coordinate system, it is checked, in step 403, whether the new position is proximate to a position corresponding to a preferred combination of values of the selected control parameters. If so, the indicated position is adjusted to said proximate position, in step 404. In step 405, the first control parameter is adjusted in accordance with one coordinate of the selected position in the coordinate system. In step 406, the second control parameter is adjusted in accordance with another coordinate of the selected position in the coordinate system.

Throughout the Figures, identical reference numerals indicate similar or corresponding features. Some of the features indicated in the drawings are typically implemented in software, and as such represent software entities, such as software modules or objects.

While the invention has been described in connection with preferred embodiments, it will be understood that modifications thereof within the principles outlined above will be evident to those skilled in the art, and thus the invention is not limited to the preferred embodiments but is intended to encompass such modifications. Thus, for example, instead of a two-dimensional coordinate system, a three-dimensional system may be used, in combination with input means for enabling the user to indicate a position within a three-dimensional space. The graphical user interface according to the invention may also be displayed on the graphical display of a portable audio device capable of adjusting for example pitch and tempo independently. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements. 'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. A 'computer program' is to be understood to mean any software product stored on a computer-readable medium, such as a floppy disk, downloadable via a network, such as the Internet, or marketable in any other manner.

The invention claimed is:

1. An audio control system comprising:
   a sound processing device that produces audio signals based on values of audio content material and a plurality of control parameters that affect rendering of the values as audio signals,
   an input device that is configured to enable a user to simultaneously control at least two control parameters of the plurality of control parameters based on a coordinate system corresponding to control of the at least two control parameters, and
   a controller that is configured to control the at least two control parameters based on a user-determined position within the coordinate system.

2. The system of claim 1, wherein the at least two control parameters include a treble control and a base control.

3. The system of claim 2, wherein the at least two control parameters include a volume control.

4. The system of claim 1, wherein the at least two control parameters include a pitch control and a tempo control.

5. The system of claim 1, wherein the at least two control parameters include a time-scaling control.

6. The system of claim 1, wherein the at least two control parameters include a pitch-scaling control.

7. The system of claim 1, including a display that is configured to display the coordinate system and the user-determined position within the coordinate system.

8. The system of claim 1, including a memory that is configured to store combinations of recommended values of the at least two control parameters.

9. The system of claim 8, wherein the controller is configured to control the at least two control parameters based on the recommended values of the at least two control parameters.

10. The system of claim 8, wherein one or more of the combinations of recommended values are user-definable.

11. The system of claim 1, wherein the input device includes a touch-screen.

12. The system of claim 1, wherein the input device includes one of a mouse and a trackball.

13. The system of claim 1, wherein the controller is configured to render current values of the audio content material as audio signals affected by changes to the at least two control parameters in response to changes of the user-determined position within the coordinate system.

14. The system of claim 11, wherein the controller is configured to limit the changes of one or more of the at least two control parameters in response to the changes of the user-determined position.

15. A computer program stored on a non-transient computer readable medium that, when executed by a processor, causes the processor to:
   receive a user input that provides a user-defined position within a multi-dimensional coordinate system,
   determine at least two control parameters that affect rendering of values of audio content material into audio signals based on the user-defined position within the multi-dimensional coordinate system, and
   provide the at least two control parameters to a sound processing device that produces audio signals based on subsequent values of audio content material and the at least two control parameters.

16. The program of claim 15, wherein the at least two control parameters include a treble control and a base control.

17. The program of claim 15, wherein the at least two control parameters include a volume control, a treble control, and a bass control.

18. The program of claim 15, wherein the at least two control parameters include a pitch control and a tempo control.

19. The program of claim 15, wherein the at least two control parameters include a time-scaling control.

20. The program of claim 15, wherein the at least two control parameters include a pitch-scaling control.

21. The program of claim 15, wherein the program is configured to cause the processor to provide a display of the coordinate system and the user-determined position within the coordinate system.

22. The program of claim 15, wherein the program is configured to cause the processor to identify combinations of recommended values of the at least two control parameters.

23. The program of claim 22, wherein the program is configured to cause the processor to determine the at least two control parameters based on the recommended values of the at least two control parameters.

24. The program of claim 22, wherein one or more of the combinations of recommended values are user-definable.

25. The program of claim 15, wherein the program is configured to cause the processor to receive the user input via a touch-screen.

26. The program of claim 15, wherein the program is configured to cause the processor to receive the user input via one of a mouse and a trackball.

27. The program of claim 15, wherein the sound processing device is configured to render current values of the audio content material as audio signals affected by changes to the at least two control parameters in response to changes of the user-determined position within the coordinate system.

28. The program of claim 27, wherein the program is configured to cause the processor to limit the changes of one or more of the at least two control parameters in response to the changes of the user-determined position.

* * * * *